United States Patent [19]

Shimada et al.

[11] Patent Number: 5,430,519
[45] Date of Patent: Jul. 4, 1995

[54] LIGHT-AMOUNT CONTROLLING APPARATUS

[75] Inventors: Koichi Shimada, Yokozemachi; Osamu Sato, Ranzanmachi, both of Japan

[73] Assignee: Canon Denshi Kabushiki Kaisha, Chichibu, Japan

[21] Appl. No.: 205,484

[22] Filed: Mar. 3, 1994

[30] Foreign Application Priority Data

Mar. 4, 1993 [JP] Japan .................. 5-044155
Mar. 19, 1993 [JP] Japan .................. 5-060455
Mar. 19, 1993 [JP] Japan .................. 5-060456

[51] Int. Cl.⁶ .............................. G03B 9/02
[52] U.S. Cl. ........................ 354/271.1; 348/363
[58] Field of Search ............. 354/234.1, 235.1, 271.1, 354/272, 273, 274; 348/363; 359/230, 739, 740

[56] References Cited

U.S. PATENT DOCUMENTS 5,072,162 12/1991 Sato et al. ............. 348/363 X

FOREIGN PATENT DOCUMENTS 4-344157 5/1991 Japan .
4-344158 5/1991 Japan .

Primary Examiner—Howard B. Blankenship
Attorney, Agent, or Firm—Spencer, Frank & Schneider

[57] ABSTRACT

In a light amount controlling apparatus, there are provided a circular-shaped bottom plate having an opening at a center thereof, for supporting a diaphragm blade in such a manner that the diaphragm blade can be opened and closed to control an amount of light passing through the opening; base plate mounted to the bottom plate being arc-shaped so that the base plate is not projected to the opening and from a circular contour thereof; a magneto rotor rotatably supported by the base plate and having a drive lever for driving the diaphragm blade; a stator positioned and supported by the base plate, whose both poles are located opposite to each other while sandwiching the magneto rotor therewith; an electromagnetic coil surrounding the stator; and a cover member positioned and supported by the stator, and having a bearing portion for rotatably supporting the magneto rotor, and a coupling means for coupling the base plate with the cover member. The light-amount controlling apparatus further includes a Hall element for detecting magnetic force produced by the magneto rotor, and a drive control circuit for controlling an amount of a current supplied to the electromagnetic coil in order that the magnetic rotor is driven to a predetermined angular position based upon the detection result of the Hall element.

21 Claims, 19 Drawing Sheets

LIGHT-AMOUNT CONTROLLING APPARATUS

BACKGROUND OF THE INVENTION

1. Field of the Invention

The present invention relates to a light-amount controlling apparatus capable of controlling an amount of light received by an optical instrument such as a video camera, and also to a motor employed in this light-amount controlling apparatus.

2. Description of Prior Art

Conventionally, a driving unit of a light-amount controlling apparatus (diaphragm apparatus) assembled into an optical instrument, for instance, a video camera, is in the form of a cylindrical galvanometer. FIG. 8 is an exploded perspective view showing such a conventional galvanometer type diaphragm apparatus. In FIG. 8, reference numeral 24 indicates a base plate for mounting a diaphragm unit and a galvanometer constituting a drive source therefor, reference numeral 37 designates an electromagnetic coil, and reference numeral 33 denotes a bobbin used to wind the electromagnetic coil 37 thereon. Reference numeral 38 represents the same bobbin as the above-described bobbin 33, but no electromagnetic coil is wound on this bobbin 38. Further provided is a magneto rotor 36; a Hall element 34, a yoke 31 used to stabilize magnetic flux; a printed circuit board 35; an upper cover 32, and a screw 39, respectively.

FIG. 9B schematically shows a construction of the cylindrical electromagnetic circuit portion shown in FIG. 8. The outermost diameter of the galvanometer unit corresponds to at least the outer diameter of the yoke 31, namely approximately "2D" with respect to the basic diameter "D" of the magneto rotor 36. As easily seen from FIG. 9B, a dead space "DS" would be produced in such a light-amount controlling apparatus wherein the magneto rotor 36 is driven by way of the electromagnetic coil 37, and the driving speeds of the magneto rotor 36 are controlled by utilizing the Hall element 34. In other words, although the ideal shape of a lens-barrel employed in a video camera and the like is cylindrical, the galvanometer type driving unit of the conventional light-amount controlling apparatus is projected out from the lens-barrel, as illustrated in FIG. 9B.

As to the assembly of the conventional light-amount controlling apparatus, the bobbins 33 and 38 constitute a major element of the magneto rotor 36. Then, members 31, 33, 34, 35, 36, 37, and 38 are incorporated between the base plate 24 and the upper cover 32. The upper cover 32 is screwed to the base plate 24 by a screw 39. Subsequently, a shaft 36a of the magneto rotor 36 is press-fitted, or adhered into a hole 22a of a lever 22, so that the magneto rotor 36 is assembled with the lever 22. Then, a spring 23 is further assembled to the resultant structure, and finally the drive unit is completed. In addition, a windmill type lever 20, diaphragm blades 25, 26, 27, and a cover 28 are attached onto the drive unit.

However, since the galvanometer type driving unit of the conventional light-amount controlling apparatus has a cylindrical shape, there are the following drawbacks:

(1) While a lens (camera) is made compact, even when a diaphragm mechanism unit is stored within a lens cylinder (barrel), the galvanometer type driving unit projects out from the lens cylinder.

(2) Since no damping coil is required in the galvanometer type driving unit for controlling speeds by way of the Hall element, an empty space is necessarily made therein, resulting in a so-called "dead space".

(3) As the magneto rotor is sealed into the electromagnetic coil and the bobbin, both the magnet and the driving lever cannot be formed in an integral body.

(4) As a result of the above-described drawback (3), the driving lever is fitted with the shaft under a certain pressure, or adhered to the shaft by way of a proper adhesive agent. Accordingly, it is very difficult as a practical matter to obtain adherence of the appropriate strength between the driving lever and the shaft. The connection between them may collapse, which would cause problems in the operation of the driving unit.

(5) The driving lever should be properly positioned with respect to the magnetic pole direction of the magnet. Under such circumstances, there is a great fluctuation in the precision with which the driving lever is positioned when it is jointed to the shaft.

On the other hand, when the galvanometer type driving unit is assembled, a large number of joint components such as screws are required. This assembly work must be carried out while picking up a large quantity of screws. Further various type of tools must be utilized. Therefore, there are the below-mentioned drawbacks:

(a) The total number of components is large.
(b) The work location is restricted only to the place where the tools are installed.
(c) A large number of working stages are required.
(d) An insufficient screwing condition and a loose screwing condition may occur.

SUMMARY OF THE INVENTION

The present invention has been made in an attempt to solve the above-described drawbacks of the conventional light-amount controlling apparatus, and therefore, has an object to provide a light-amount controlling apparatus capable of omitting such a "dead space" even in a lens barrel under conditions that the light-amount controlling apparatus can be easily assembled with easy supervision on joint strengths. Another object of the present invention is to provide a light-amount controlling apparatus capable having a driving unit that is assembled without using a screw.

A further object of the present invention is to provide such a light-amount controlling apparatus that even when a lens barrel is replaced by another lens barrel, a driving unit of the first-mentioned lens barrel need not be changed in correspondence with replacement of the lens barrel.

To achieve the above-described objects and other features of the present invention, an improved light-amount controlling apparatus is provided.

In the first aspect of the present invention, a light-amount controlling apparatus for controlling an amount of light passing therethrough by opening and closing a diaphragm blade comprises:

a magneto rotor constructed of a cylindrical permanent magnet, for opening and closing the diaphragm blade by being rotated around a shaft;

an electromagnetic coil;

a magnetic force inducing element for inducing magnetic force in such a manner that the magnetic rotor is sandwiched with maintaining a space by both magnetic poles produced by the electromagnetic coil;

a magnetic force detecting element for detecting the magnetic force produced by the magneto rotor; and a drive control circuit for setting the magneto rotor to a desired angular position by feeding back thereto the detection result from the magnetic force detecting element, thereby supplying a desired current to the electromagnetic coil.

Here, at least the magneto rotor, the electromagnetic coil and the magnetic force inducing element may be made in an arc shape and may be assembled in such a manner that they are easily stored along an inner wall of a lens barrel.

The magnetic force detecting element may be a Hall element.

The magnetic force inducing element may be constructed of a first stator and a second stator;

the first stator having one end from which one magnetic pole of the magnetic force produced by the electromagnetic coil may be induced to an adjacent portion of one side wall of the magneto rotor, and having the other end which penetrates through the electromagnetic coil and projects therefrom; and the second stator having one end from which the other magnetic pole of the magnetic force produced by the electromagnetic coil may be induced to an adjacent portion of the other side wall of the magneto rotor, and having the other end which is abutted to the other end of the first stator, thereby forming a magnetic path.

When the drive control circuit does not supply the current to the electromagnetic coil, the magneto rotor may be energized along a first rotation direction by rotation force produced between the magnetic force inducing element and the magneto rotor in response to magnetic force produced by itself; and when the drive control circuit supplies the current to the electromagnetic coil, the magneto rotor may be rotated along a second rotation direction opposite to the first rotation direction.

In the second aspect of the present invention, a light-amount controlling apparatus comprises:

a circular-shaped bottom plate having an opening at a center thereof, for supporting a diaphragm blade in such a manner that the diaphragm blade can be opened and closed to control an amount of light passing through the opening;

a base plate mounted on the bottom plate, the base plate being arc-shaped in such a manner that the base plate is not projected to the opening and from a circular contour of the bottom plate;

a magneto rotor rotatably supported by the base plate and having a drive means for the diaphragm blade;

a stator positioned and supported by the base plate, whose both poles are located opposite to each other while sandwiching the magneto rotor therewith;

an electromagnetic coil surrounding the stator; and a cover member positioned and supported by the stator, and having a bearing portion for rotatably supporting the magneto rotor, and a coupling means for coupling the base plate with the cover member.

Here, the magneto rotor may include a cylindrical permanent magnet, and the drive means may comprise a drive lever made of a resin which has been insert molded with the cylindrical permanent magnet.

The coupling means may comprise a hook member having elasticity and extended from a side edge portion of the cover member, and a stepped portion formed on the base plate and engaged with the hook member.

A tip portion of the hook member may be tapered.

The base plate and the bottom plate may be engaged integrally in such a manner that a hook claw integrally formed on the bottom plate is engaged with a stepped portion formed on the base plate.

The base plate and the bottom plate may be formed in an integral form.

The light-amount controlling apparatus may further comprise:

magnetic force detecting means for detecting magnetic force produced by the magneto rotor; and drive controlling means for controlling an amount of current supplied to the electromagnetic coil so as to drive the magneto rotor at a predetermined angular position based on the detection result of the magnetic force detecting means.

Here, the magnetic force detecting means may include a Hall element packaged on a flexible circuit board, the drive controlling means may include a drive controlling circuit packaged on the flexible circuit board, and the flexible circuit board may be attached to the cover member.

The stator may include a first stator and a second stator;

one end of the first stator may be arranged near the magneto rotor, and the other end of the first stator may be arranged in such a way that the other end thereof is penetrated through the electromagnetic coil and projected therefrom; and one end of the second stator may be arranged adjacent the magneto rotor, and the other end of the second stator may be arranged in such a manner that the other end thereof is abutted to the other end of the first stator.

The base plate may have first and second concaves for storing the magneto rotor and one end portion of the electromagnetic coil respectively, and the cover member may have first and second concaves for storing the magneto rotor and the other end portion of the electromagnetic coil.

The stator may have a plurality of through holes for positioning and supporting purposes, the cover member may have a hole, and the base plate may have a shaft commonly engaged with any one of the plural through holes and the hole of the cover member.

The stator may have a plurality of through holes for positioning and supporting purposes, and both of the cover member and the base plate may have shafts which are fitted from both sides of the plural through holes into the plural through holes.

In the third aspect of the present invention, a light-amount controlling apparatus for controlling an amount of light passing therethrough by opening and closing a diaphragm blade, comprises:

a magneto rotor constructed of a cylindrical permanent magnet, for opening and closing the diaphragm blade by being rotated around a shaft;

a magnetic force detecting element for detecting magnetic force generated from the magneto rotor;

an electromagnetic coil for producing magnetic force used to rotate the magneto rotor up to a desired angular position in response to the detection result of the magnetic force detecting element;

a base plate for assembling at least the magneto rotor and the electromagnetic coil in an arc shape in such a manner that the magneto rotor and the electromagnetic coil can be stored a long an inner wall of a lens barrel; and a bottom plate separably formed with the base plate in an integral form, for storing the diaphragm blade into the lens barrel.

Here, both of the base plate and the bottom plate may be separably engaged in an integral form by a hook claw.

Both the base plate and the bottom plate may be separably secured in an integral form by way of a screw.

The magnetic force detecting element may be a Hall element.

In the fourth aspect of the present invention, a light-amount controlling apparatus for controlling an amount of light passing therethrough by opening and closing a diaphragm blade, comprises:

a stator having a first major magnetic pole and a second major magnetic pole, which sandwich a gap;

a field coil wound on the stator;

a permanent magneto rotor rotatably supported within the gap, for opening and closing the diaphragm blade;

auxiliary magnetic poles for exerting detent torque in a direction along which detent torque exerted by the stator and given to the permanent magneto rotor is canceled by the first-mentioned detent torque;

a control unit for properly supplying a current to the field coil so as to rotate the permanent magneto rotor within the gap in either a clockwise direction, or a counter-clockwise direction; and wherein the detent torque given by the auxiliary magnetic poles to the permanent magneto rotor is made smaller than the detent torque given by the major magnetic poles to the permanent magneto rotor.

Here, the first major magnetic pole and the second major magnetic pole of the stator may be arranged in such a manner that the first and second major magnetic poles are located opposite to each other to define a preselected space between them and the permanent magneto rotor, while sandwiching the permanent magneto rotor;

the auxiliary magnetic poles may be arranged in such a manner that the auxiliary magnetic poles are positioned opposite to the permanent magneto rotor to define a space similar to the preselected space at a position shifted by 90° with respect to a rotation direction of the permanent magneto rotor; and a facing area defined between the auxiliary magnetic poles and the permanent magneto rotor may be made smaller than a facing area defined by the major magnetic poles and the permanent magneto rotor.

The auxiliary magnetic poles may be arranged in such a manner that the auxiliary magnetic poles are located opposite to each other at a position shifted by an angle slightly smaller than 90° with respect to a rotation direction of the permanent magneto rotor while keeping a space similar to the preselected space defined by the major magnetic poles and the permanent magneto rotor.

The first major magnetic pole and the second major magnetic pole may be arranged in such a manner that the first major magnetic pole is positioned opposite to the second major magnetic pole while keeping a predetermined facing area between itself and the permanent magneto rotor, and sandwiching the permanent magneto rotor;

the auxiliary magnetic poles may be arranged in such a manner that the auxiliary magnetic poles are located opposite to each other while keeping a facing area similar to the facing area defined by the major magnetic poles and the permanent magneto rotor at a position shifted by 90° with respect to a rotation direction of the permanent magneto rotor; and the space defined between the auxiliary magnetic poles and the permanent magneto rotor may be made larger than the space defined between the major magnetic poles and the permanent magneto rotor.

The auxiliary magnetic poles may be integrally formed with the major magnetic poles.

In accordance with the present invention, there are the following advantages:

(1) The magnet, the shaft and the driving lever can be made in an integral body due to the newly developed magneto rotor. That is, the magnet, shaft and driving lever may be constructed in an integral body by using the same material, for instance, the molding materials employed in an ferrite magnet, resulting in a single component, although conventionally the magnet, the shaft, and the driving arm are made of separate materials and are conventionally assembled. As a consequence, the diaphragm unit may be made compact and also the "dead space" could be effectively eliminated.

(2) Since the arc-shaped structure is introduced, the lens cylinder for a video camera and the like may be made compact.

(3) As previously described, since the relevant components could be made in an integral body, higher positioning precision can be assured. Accordingly, this may solve the conventional problems of deteriorated performance and instability caused by positional shifts between the driving arm and the magnet.

(4) Since the driving force is produced from the electromagnetic coil, the structure of the bobbin may be made with a simple shape. Moreover, this bobbin may be easily wound by coils, which may prevent disconnection of the coils.

(5) Since the spring 23 employed in the conventional cylindrical driving unit is no longer required, conventional problems could be solved, such as operation currents being adversely influenced by fluctuation in spring forces of spring 23, furthermore, smooth operations could not be achieved due to the sliding conditions of spring 23.

Also, according to other features of the present invention, there are provided the below-mentioned advantages:

(a) The driving unit may be assembled without using a screw.

(b) It is possible to suppress an increase in the quantity of components employed in the light-amount controlling apparatus of the present invention.

(c) The light-amount controlling apparatus of the present invention may be assembled at a place where no tools are available.

(d) A total assembling stage of this light-amount controlling apparatus may be reduced, as compared with that of the conventional light-amount controlling apparatus.

(e) The conventional problems of insufficient screwing works and loose screwing conditions could be solved.

In addition, since the base plate is separated from the bottom plate, the driving unit mounted onto the base plate may be made in a unit form. In other words, even when the lens barrel and the diaphragm mechanism would be replaced by the substitution components, this driving unit could be commonly utilized for both components.

The above and other objects, effects, features and advantages of the present invention will become more apparent from the following description of the embodiment thereof taken in conjunction with the accompanying drawings.

BRIEF DESCRIPTION OF THE DRAWINGS

For a better understanding of the present invention, reference is made of the detailed description to be read in conjunction with the accompanying drawings, in which.

DETAILED DESCRIPTION OF THE PREFERRED EMBODIMENT

Referring now to drawings, a description will be made of light-amount controlling apparatuses and motors used therein according to a presently preferred embodiment of the present invention.

Figure 1:
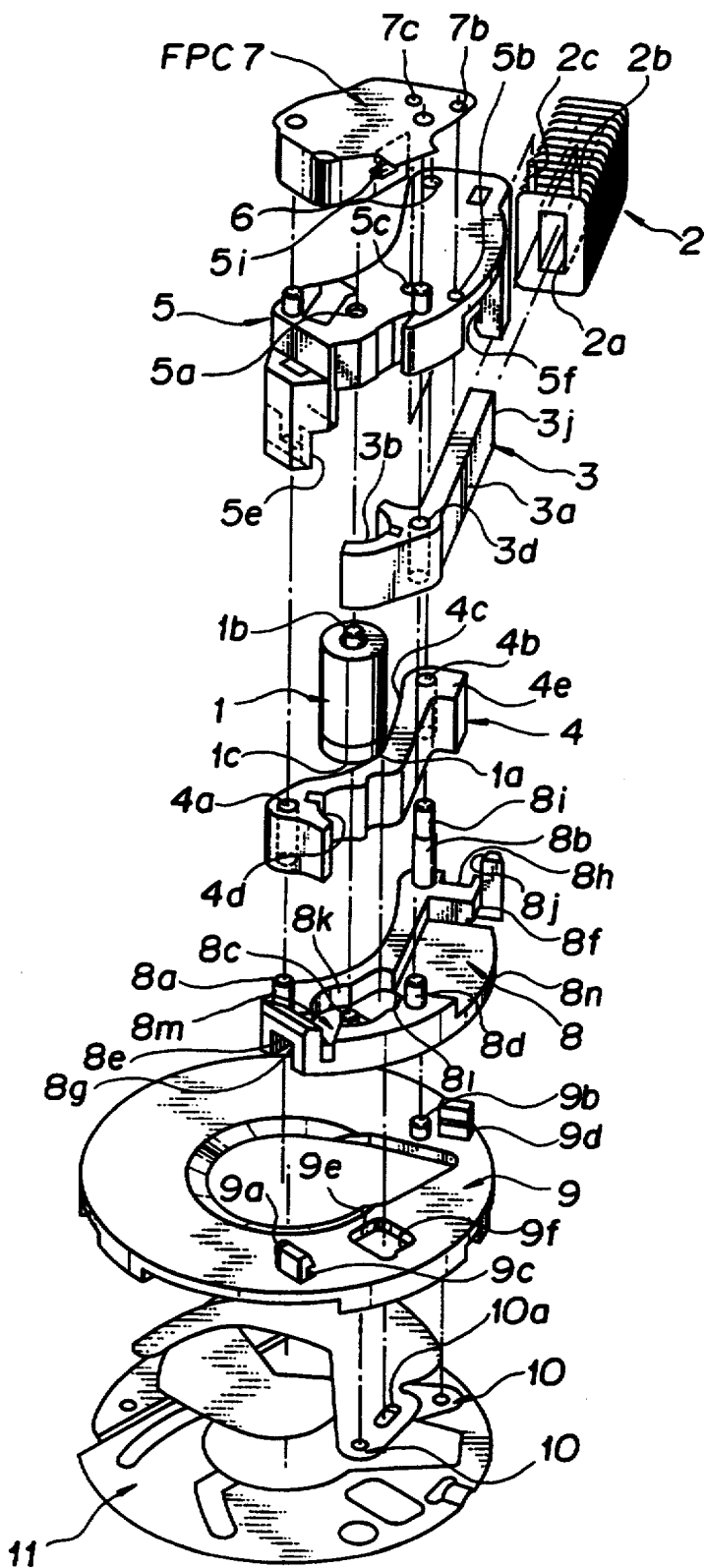
FIG. 1 is an exploded perspective view showing a light-amount controlling apparatus according to a first embodiment of the present invention.

FIG. 1 is an exploded perspective view of a light-amount controlling apparatus according to a first embodiment of the present invention.

Figure 5:
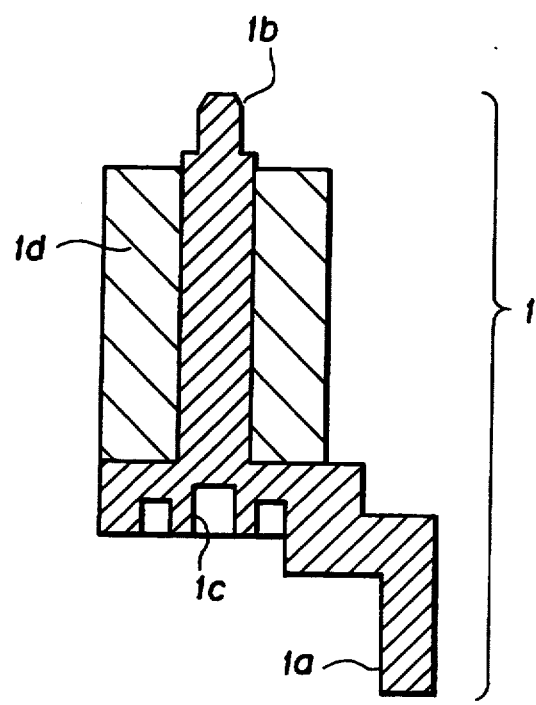
FIG. 5 is a sectional view showing the magneto rotor 1 indicated in FIG. 1.

In FIG. 1, reference numeral 1 indicates a magneto rotor formed by a magnet, a shaft and a driving lever in an integral form. As illustrated in FIG. 5, the magneto rotor 1 is constructed in an integral form, including a lever portion, in a manufacturing manner so that such a molding material (i.e. a resin) is insert molded into a cylindrical-shaped hollow magnet. Reference numeral 2 shows an electromagnetic coil wound on a bobbin having a rectangular through hole 2a, and reference numerals 3 and 4 indicate stators for inducing excitation forces on the electromagnetic coil 2. One stator 3 is separately formed from the other stator 4, and is assembled with the other stator 4 to produce an electromagnetic induction force. The stator 3 is formed with a prism portion 3a, which is inserted through the rectangular hole 2a of the electromagnetic coil 2, and a magnetic pole portion 3b, whereas the stator 4 is formed with a curved prism portion 4c substantially parallel to the prism portion 3a, and a magnetic pole portion 4d. At one respective end portion of these stators 3 and 4, the magnetic pole portions 3b and 4d are separated from each other by a predetermined distance so as to enclose the magneto rotor 1. At the other end portions of the stators 3 and 4, a bending edge portion 4e of the curved prism portion 4c is abutted to the side surface of the prism portion 3a, thereby forming a magnetic circuit, or path.

Furthermore, one positioning through hole 3d is formed adjacent the magnetic pole portion 3b of the stator 3, and positioning through holes 4a and 4b are formed near the magnetic pole portion 4d and the bending portion 4e of the stator 4, respectively.

Reference numeral 5 shows an upper cover equipped with a bearing portion 5a for rotatably supporting the magneto rotor 1. Reference numeral 6 indicates a Hall element. Reference numeral 7 is a flexible circuit board (simply referred to an "FPC" hereinafter) having a soldering joint portion for electrically inputting/outputting signals. This soldering joint portion is used to joint a soldering joint portion of the Hall element 6 and the lead portion of the electromagnetic coil 2. Reference numeral 8 indicates a base plate of a driving unit on which the above-explained members 1 to 5 are mounted. Reference numeral 9 shows a bottom plate functioning as an entire foundation for the light-amount controlling apparatus according to the first embodiment of the present invention. Reference numeral 10 represents diaphragm blades for controlling an amount of light passing therethrough. Reference numeral 11 denotes a cover plate for holding the diaphragm blades 10 in conjunction with the bottom plate 9.

Figure 2:
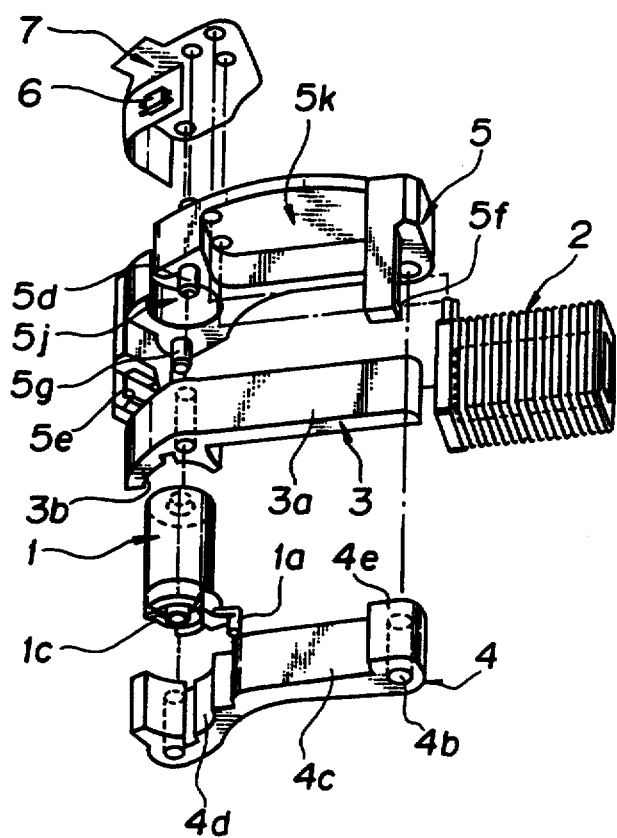
FIG. 2 is a perspective view of an upper portion of the light-amount controlling apparatus of FIG. 1, as viewed from the lower direction.

The overall shape of the upper cover 5 is configured as an arc in order that upper cover 5 can be easily stored within an inner wall of a lens barrel. Two concaves 5j and 5k are formed in the upper cover 5, as shown in FIG. 2, so as to partially store the magneto rotor 1 and the electromagnetic coil 2, respectively. Then, a bearing hole 5a is formed at a central portion of the concave 5j for rotatably supporting the magneto rotor 1.

In correspondence with the arc shape of the upper cover 5, an overall shape of the base plate 8 of the driving unit has a curved arc configuration. Similarly, two concaves 8m and 8n are formed in this base plate 8 in order to partially store the magneto rotor 1 and the electromagnetic coil 2, respectively. A shaft 8c is provided at a central portion of the concave 8m for receiving the magneto rotor 1.

It should be noted that both the bottom plate 9 and the cover plate 11 have circular shapes so as to be stored within the lens barrel.

When power is supplied via FPC 7 to the electromagnetic coil 2, the stators 3 and 4 are energized, so that the magneto rotor 1 is rotated. At this time, when the current supplied to the electromagnetic coil 2 is controlled by way of a control unit (not shown) in response to an output derived from the Hall element 6, both an angular position, where the magneto rotor 1 is stopped, and a rotation speed, at which the magneto rotor 1 is rotated and then stopped at the angular position, can be controlled. In response to the rotation of the magneto rotor 1, a pin 1a, a formed at a tip portion of the lever portion of the magneto rotor 1, gives a driving force via an elongated hole 10a of one of the diaphragm blades 10 to this diaphragm blade 10, thereby opening and closing the diaphragm blades 10.

Figure 3A:
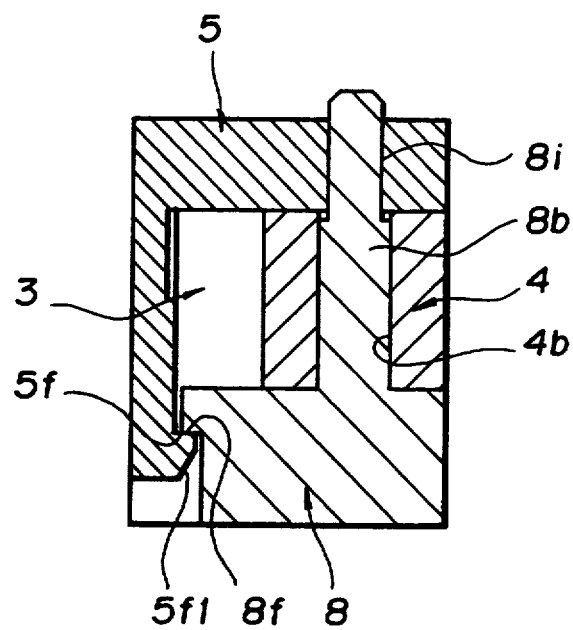
FIG. 3A is a sectional view of a portion 5f shown in the light-amount controlling apparatus of FIG. 1.

It should also be noted that the above-described components 1 to 8 may be constructed as a driving unit in a unit form. This unit form of members 1 to 8 will now be explained. First, the stator 4 is assembled into the base plate 8 and the positioning shaft portions 8a and 8b, formed in the base plate 8, are fitted into the holes 4a and 4b formed in both end portions of the stator 4 (see FIGS. 3 and 4). Subsequently, the shaft 8c is engaged with the bearing hole 1c (see FIGS. 1 and 5), which is coaxially positioned with respect to the rotor shaft 1b formed in the magneto rotor 1, in order to be slidably engaged with the shaft 8c of the base plate 8. Then, the stator 3, which has been previously inserted into the rectangular hole 2a of the electromagnetic coils 2, is assembled with the base plate 8, while the positioning shaft portion 8d formed in the base plate 8 is fitted into the hole 3d made in the stator 3. Hook members 5e and 5f, which are formed with the upper cover 5 in an integral form and with proper elasticity, are engaged with stepped portions 8e and 8f formed on the base plate 8 in correspondence with the hook members 5e, 5f, respectively, in such a manner that hook members 5e and 5f are abutted and pressed into the stepped portions (see FIGS. 3A and 4). Tip portions of the hook members 5e and 5f are tapered at 5e1 and 5f1 in order to establish an easy engagement with the stepped portions 8e and 8f. It should be understood that the hook member 5f has an effective force also in a direction along which the stator 3 is close-fitted to the stator 4. At this time, the positioning shafts (namely shafts 5g and 5d of FIG. 2), formed in the reverse side of the upper cover 5 in correspondence with the holes 4a and 3d of the stators 3 and 4, are simultaneously inserted under light pressure and fitted thereto, whereas a shaft portion 8i elongated from the shaft 8b of the base plate 8 is inserted under light pressure and fitted into a hole 5i of the upper cover 5.

Figure 3B:
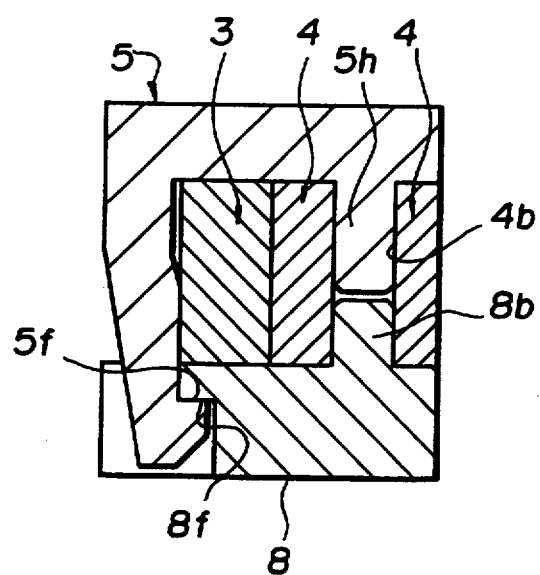
FIG. 3B is a sectional view of another portion corresponding to the portion 5f of FIG. 1, according to another embodiment of the present invention.
Figure 4:
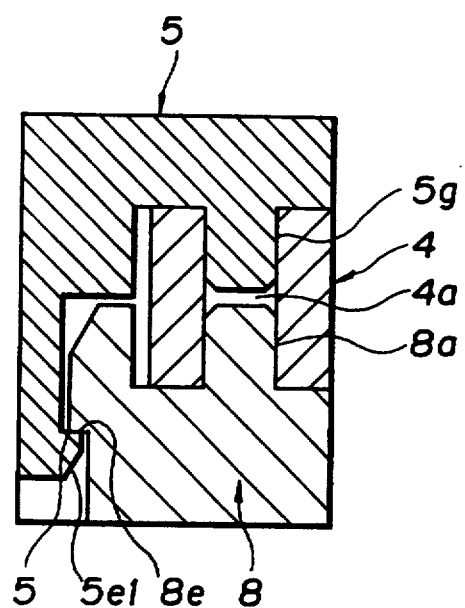
FIG. 4 is a sectional view of a portion 5e shown in FIG. 1.

It should be understood that as shown in FIG. 3B, a shaft 5h may be formed with the upper cover 5 in an integral form instead of modifying shaft portion 8b with elongated shaft 81. Then, the shaft 5h may be inserted into the hole 4b.

At the same time, the shaft portion 1b of the magneto rotor 1 is rotatably inserted into the bearing hole 5a of the upper cover 5. Simultaneously, coil lead terminals 2b and 2c, provided on the electromagnetic coil 2, are penetrated into through holes 5b and 5c of the upper cover 5 with play. Next, the FPC 7 on which the Hall element 6 has been previously mounted is fixed to the upper cover 5 by, for example, an adhesive. In this case, the terminals 2b and 2c, which have penetrated through the holes 5b and 5c, and project from the upper cover 5, further penetrate through solder land holes 7b and 7c formed in the FPC 7, and the terminals 2b and 2c are soldered with the solder land patterns formed around the holes 7b and 7c so that the driving unit can be constructed. This driving unit is abutted to the hook claws 9c and 9d, which are formed on the bottom plate 9 in an integral form and have proper elasticity, and then the stepped portions 8g and 8h of the base plate 8 are pressure-inserted thereto to establish engagement. As a result, the base plate 8 (namely, the driving unit) may be formed with the bottom plate 9 in an integral form.

Figure 6A:
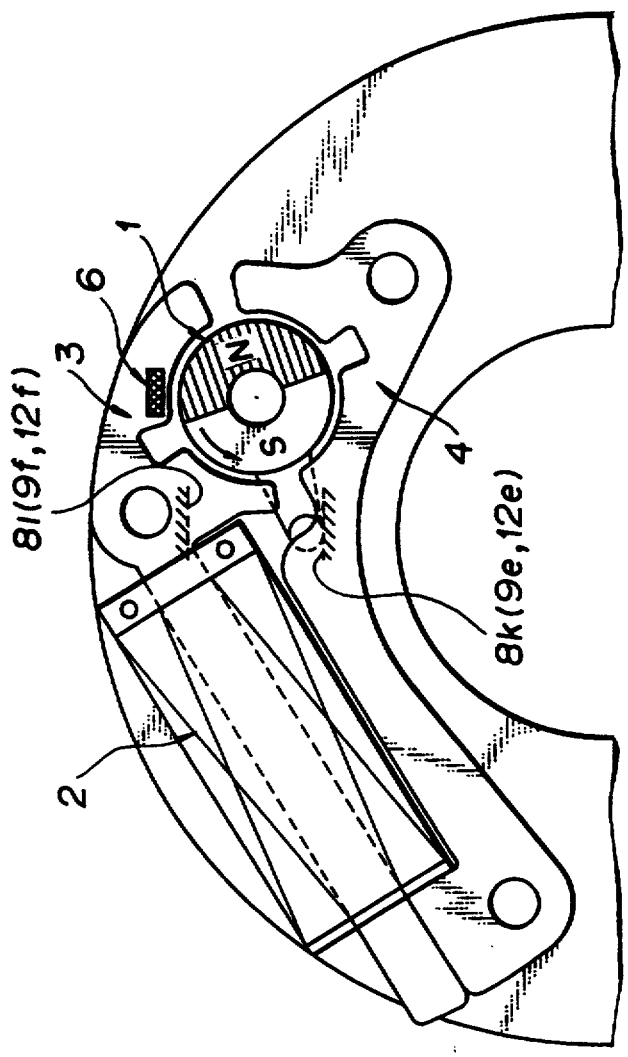
FIGS. 6A, 6B and 6C are plan views for representing drive positional relationships among the electromagnetic coil 2, the stators 3,4 and the magneto rotor 1 shown in FIG. 1.
Figure 6B:
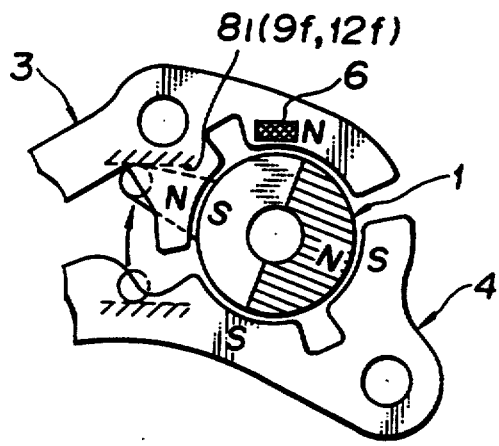
Figure 6C:
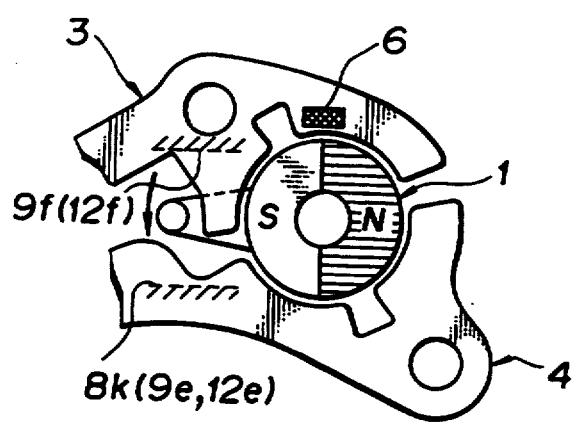

Referring now to FIGS. 6A to 6C, a description will be made of operations of the arc-shaped galvanometer type driving unit. FIG. 6A schematically shows a condition wherein the diaphragm blades 10 of the first embodiment shown in FIG. 1 are held at the closed position thereof. Under this condition, the electromagnetic coil 2 is not energized, and the magneto rotor 1 has an energizing force in the arrow direction, (namely a counter-clockwise direction) by a self magnetizing force thereof based upon the positional relationship between the magnetic pole position of the magneto rotor 1 and the shapes of the stators 3 and 4. At this time, a further rotation of the magneto rotor 1 is blocked since the lever portion of magneto rotor 1 is abutted against a stopper 8k of the base plate 8 and a stopper 9e (12e, in FIG. 7A) of the bottom plate 9 (12, in FIG. 7A).

Figure 9B:
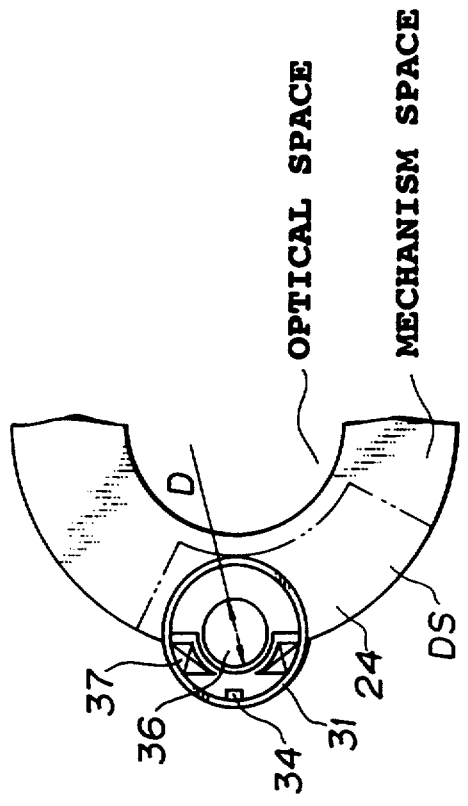
FIGS. 9A and 9B schematically illustrate an ideal component arrangement and the conventional component arrangement of the cylindrical electromagnetic circuit portions.
Figure 9A:
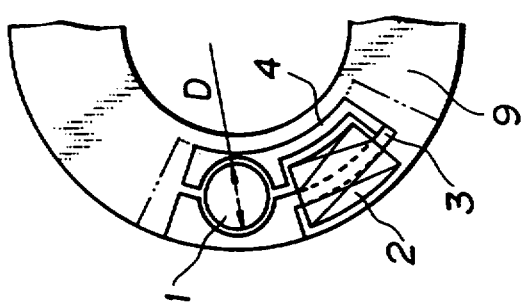

As illustrated in FIG. 6B, while a servo control by the output from the Hall element is performed, the amount of energizing power to the electromagnetic coil 2 is increased so that the polarity of the stator 3 becomes an N-pole and the polarity of the stator 4 becomes an S-pole. Accordingly, the magneto rotor 1 begins to rotate in the clockwise direction. Finally, the rotation of the rotor 1 is stopped by the stopper 81 (9f (12f in FIG. 7A) ), so that the diaphragm blades 10 are opened with a maximum aperture. Then, as shown in FIG. 6c, while the servo control is being performed in response to the output derived from the Hall element 6, when the amount of energizing power to the electromagnetic coil 2 is decreased, the magneto rotor 1 is rotated in the counter-clockwise direction and the diaphragm begins to close. Thus, the situation is returned to the condition shown in FIG. 6A. Thus, the light-amount controlling apparatus according to this first embodiment may be stored into the barrel in an ideal form, as illustrated in FIG. 9A, due to its arc shape.

Figure 7A:
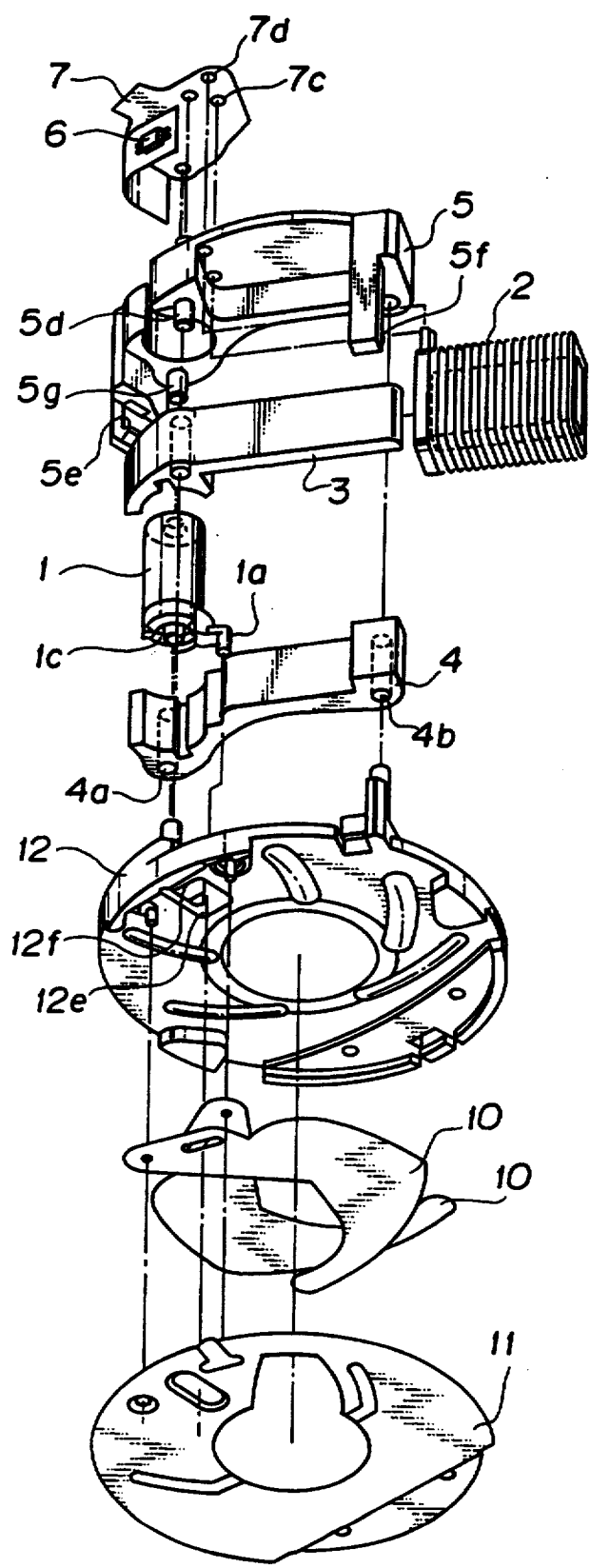
FIG. 7A is an exploded perspective view showing a light-amount controlling apparatus according to a second embodiment of the present invention.

Next, a light amount controlling apparatus according to a second embodiment of the present invention will be explained. The second embodiment has a different structure from that of the first embodiment in that the base plate 8 of the driving unit and the bottom plate 9 are formed in an integral body, which were separately arranged in the first embodiment shown in FIG. 1. These components are called a "bottom plate 12," and therefore a total number of constructive parts of this light-amount controlling apparatus is decreased. Since the remaining structures of the light-amount controlling apparatus shown in FIG. 7A are basically identical to those of the first embodiment, the same reference numerals shown in FIG. 1 will be employed as those for denoting the same or similar constructive components. Accordingly, there is a merit that this light-amount controlling apparatus shown in FIG. 7 can be automatically and easily assembled.

Figure 7B:
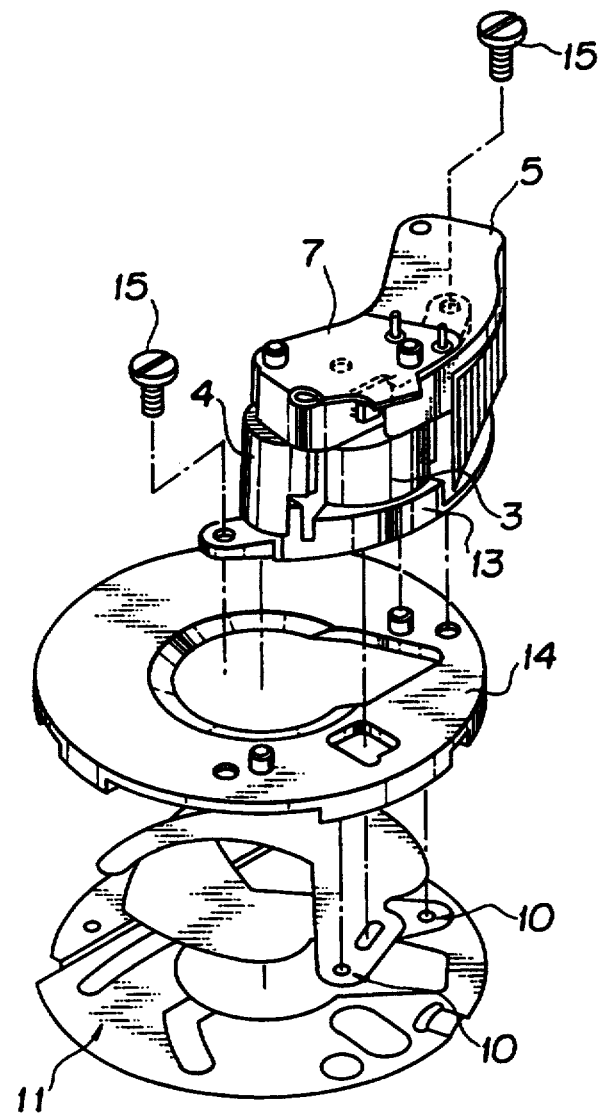
FIG. 7B is an exploded perspective view showing a light-amount controlling apparatus according to a third embodiment of the present invention.
Figure 8:
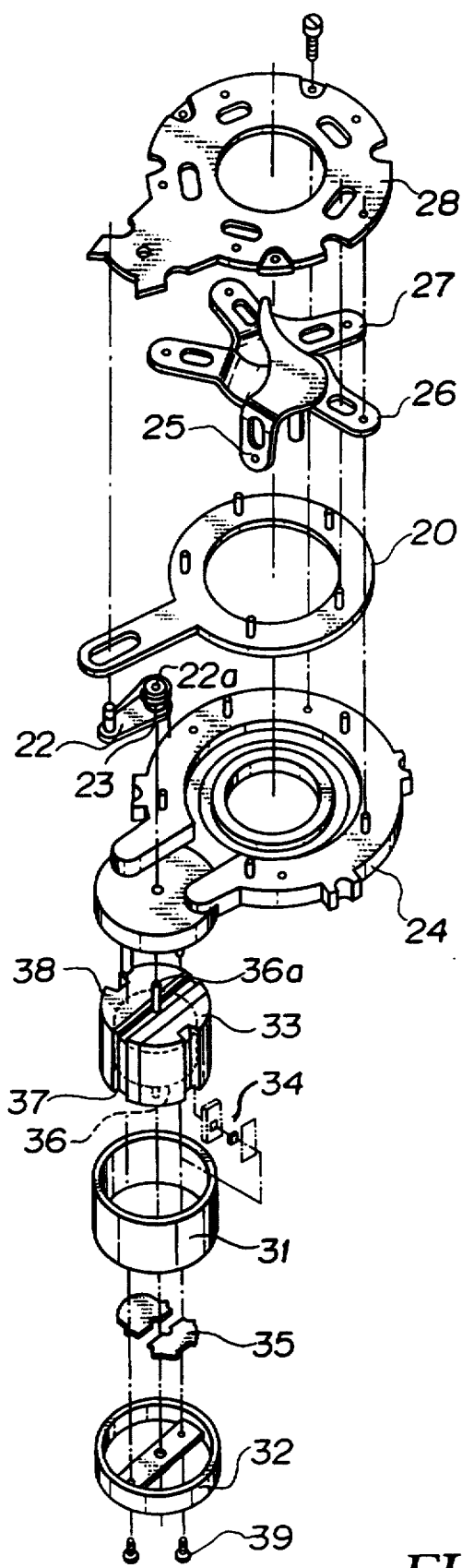
FIG. 8 is an exploded perspective view of the conventional light-amount controlling apparatus.

Next, another light-amount controlling apparatus according to a third embodiment of the present invention will be explained with reference to FIG. 7B. In the third embodiment, it is featured that a base plate 13 and a bottom plate 14 are connected with each other by way of a screw 15, instead of the base plate 8 being fixed with the hook claw of the bottom plate 9 as shown in FIG. 1. Other constructions of the third embodiment are substantially identical to these of the first embodiment shown in FIG. 1. Therefore, the same reference numerals shown in FIG. 1 are employed as those for indicating the same or similar structural components of the third embodiment.

A description will now be made of a permanent magneto rotor type single phase energizing motor suitably used as the driving source of the above-described light-amount controlling apparatuses.

Figure 10:
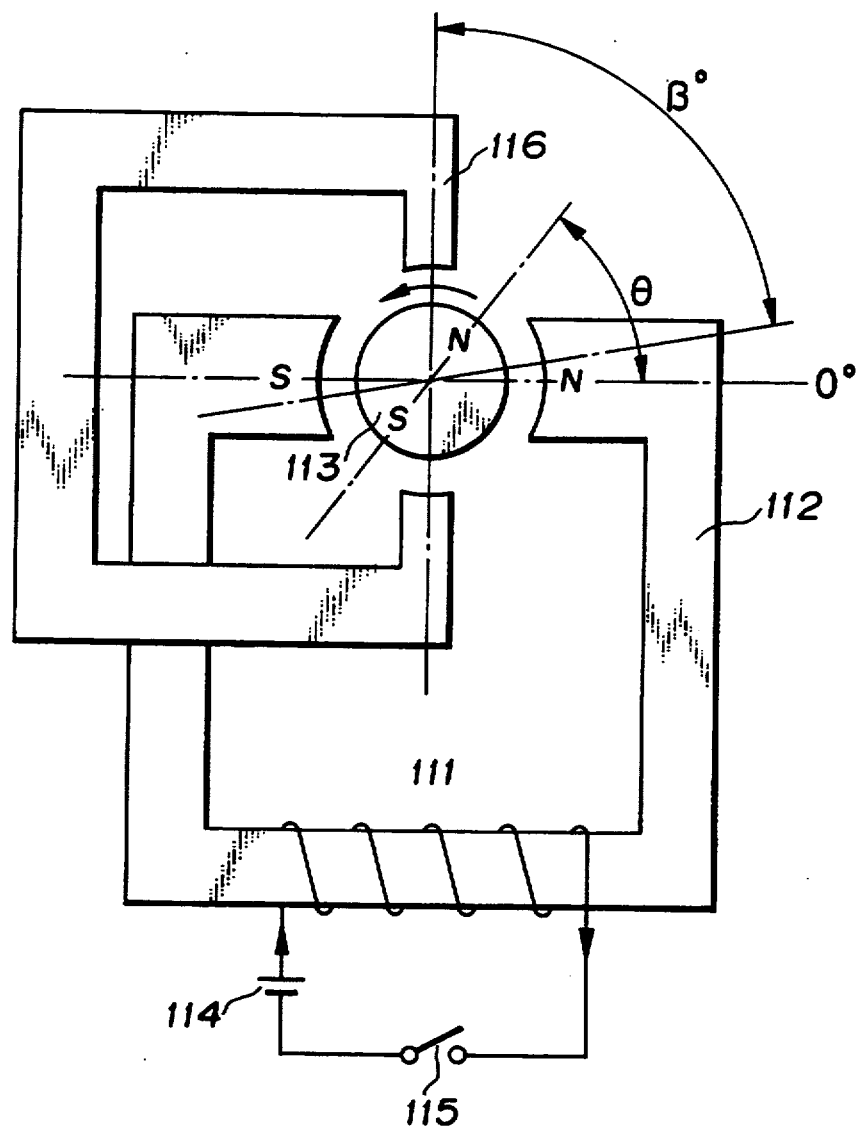
FIG. 10 schematically shows an arrangement of a motor according to a first embodiment of the present invention, employed in the light-amount controlling apparatus of the present invention.

In a motor of a first embodiment shown in FIG. 10, reference numeral 111 indicates a single phase field coil functioning as a driving source for a normal rotation direction. Reference numeral 112 shows a major magnetic pole having two magnetic poles and made of a ferromagnetic material, on which the field coil 111 is wound. Reference numeral 113 represents a permanent magneto rotor having two magnetized poles and provided at a gap portion of two-polarity major magnetic pole. Reference numeral 114 shows a power supply for supplying a current to the single phase field coil 111 so as to energize this field coil in one direction. Reference numeral 115 is a switch for turning ON/OFF the power supply 115 in order to rotate the permanent magneto rotor 113 in both of the normal rotation direction and the reverse rotation direction. Reference numeral 116 shows an auxiliary magnetic pole having two polarities, which is positionally shifted by 90° with respect to the major magnetic pole 112, and made of a core of a ferromagnetic material. A gap facing area of this auxiliary pole is smaller than that of the major magnetic pole.

With the above-described construction, magnetomotive force of the field coil 111 energized by the power supply 114 is applied via the magnetic path of the major magnetic pole 112 to the gap portion, thereby producing either a repulsion force, or an attraction force in conjunction with the magnetic force exerted from the permanent magneto rotor 13, so that permanent magneto rotor 113 is rotated in the normal rotation direction. At this time, since detent torque (namely, torque to retain the permanent magneto rotor at the stable position thereof) is exerted between the permanent magneto rotator 113 and the major magnetic pole 112, this normal rotation of the permanent magneto rotor 113 is disturbed to some extent. On the other hand, a polarity of another detent torque (will be referred to "auxiliary detent torque"), produced between the permanent magneto rotor 113 and the auxiliary magnetic pole is completely opposite to the polarity of the first-mentioned detent torque (will be referred to "major detent torque"). This auxiliary detent torque will cancel the major detent torque. In other words, the major detent torque produced from the major magnetic pole 112 may be freely controlled by this auxiliary detent torque exerted by the auxiliary magnetic pole 116. That is, a balance between the normal rotation caused by the field coil energization and the reverse rotation caused by the detent torque, may be freely set. In accordance with the present embodiment, the gap-facing area of the auxiliary magnetic pole 116 is made smaller than that of the major magnetic pole 112 so as to adjust, or control the canceling components of the detent torque caused by the auxiliary magnetic pole 116.

A description will now be made of a torque relationship among the above explained conditions with reference to FIG. 11 to FIG. 13. In the graphic representation of FIG. 11, the torque characteristic of the major magnetic pole 112 are plotted in accordance with variations in the rotation angles thereof. It should be understood that the torque along the counter clockwise direction is defined as a positive value. In this graphic representation of FIG. 11, reference numeral 121 shows driving torque produced by the energization of the field coil 111, reference numeral 122 indicates detent torque, and reference numeral 123 represents resultant torque combined the driving torque 121 with the detent torque 122. Further, "α°" shows a range over which rotation force to the rotor 113 can be given by canceling the detent torque 122 by the driving torque 121. As apparent from the range "α°" of FIG. 11, the range where the rotor 113 can be rotated only by the magnetomotive force of the field coil 111 becomes very small in this case, which is similar to the conventional characteristics.

Figure 11:
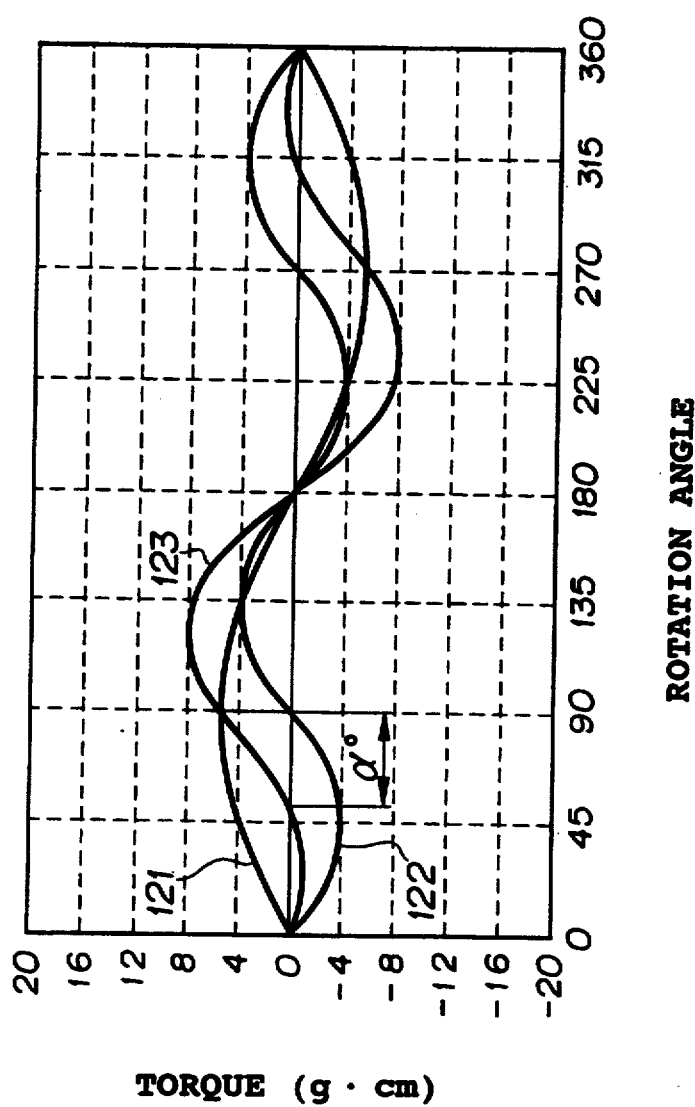
FIG. 11 is a graphic representation for explaining an operation of the motor shown in FIG. 10.
Figure 12:
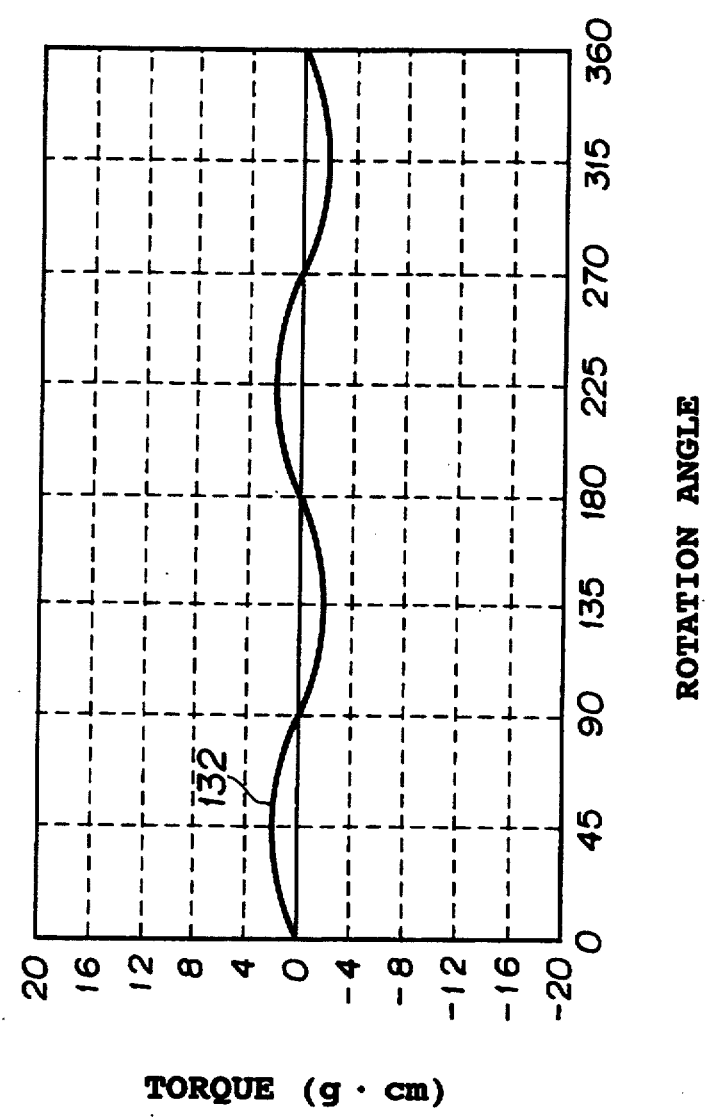
FIG. 12 is a graphic representation for indicating another operation of the motor shown in FIG. 10.

FIG. 12 graphically shows torque characteristics produced by the auxiliary magnetic pole 116 similar to FIG. 11. Reference numeral 132 shows detent torque. Since a gap-facing area of the auxiliary magnetic pole 116 is smaller than that of the major magnetic pole 112, the level of this detent torque 132 is, for instance, a half of the previous detent torque 122 shown in FIG. 11. It should be noted that since the phase is led by 90°, it is a reverse polarity.

Figure 13:
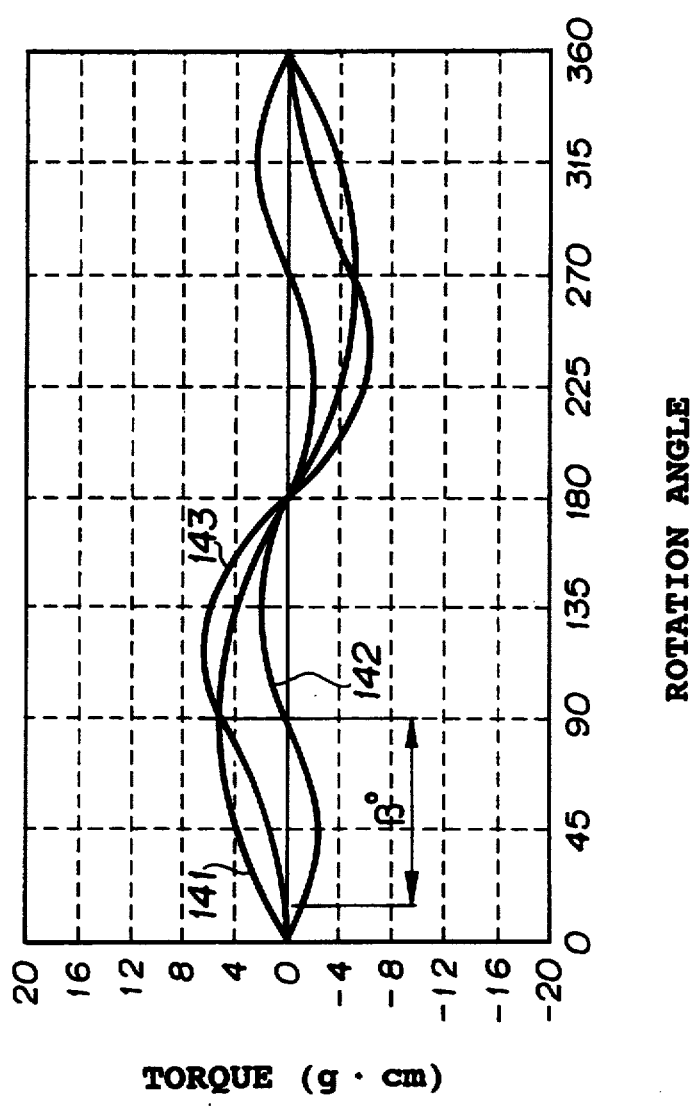
FIG. 13 is a graphic representation for indicating another operation of the motor shown in FIG. 10.

FIG. 13 graphically indicates a torque characteristic defined by combining the torque characteristic of the major magnetic pole 112 (see FIG. 11) and the torque characteristic of the auxiliary magnetic pole 116 (see FIG. 12). That is, reference numeral 141 shows drive torque caused by energization of the field coil 111, reference numeral 142 indicates resultant detent torque defined by synthesizing the detent torque of FIG. 11 with the detent torque of FIG. 12, and reference numeral 143 denotes torque defined by combining the driving torque 141 and the detent torque 142. As apparent from the torque characteristics shown in FIG. 13, since the level of the detent torque 122 caused by the major magnetic pole is canceled up to an approximately half level thereof by the detent torque 132 of the auxiliary magnetic pole 116, a range where rotation force can be applied to the rotor 113 becomes "β°" which is two times as wide as the first-mentioned range "α°".

As described above, the detent torque is controlled by the auxiliary magnetic pole 116, so that the rotor 113 can be rotated by a very small drive torque. The rotor 113 may be rotated in either the normal rotation direction, or the reverse rotation direction by receiving both of the driving torques produced by the field coil 111, which is energized from the power supply 114 by turning ON/OFF the power supply with the switch 115 shown in FIG. 10, and also by the detent torque controlled by the auxiliary magnetic pole 116.

Figure 14:
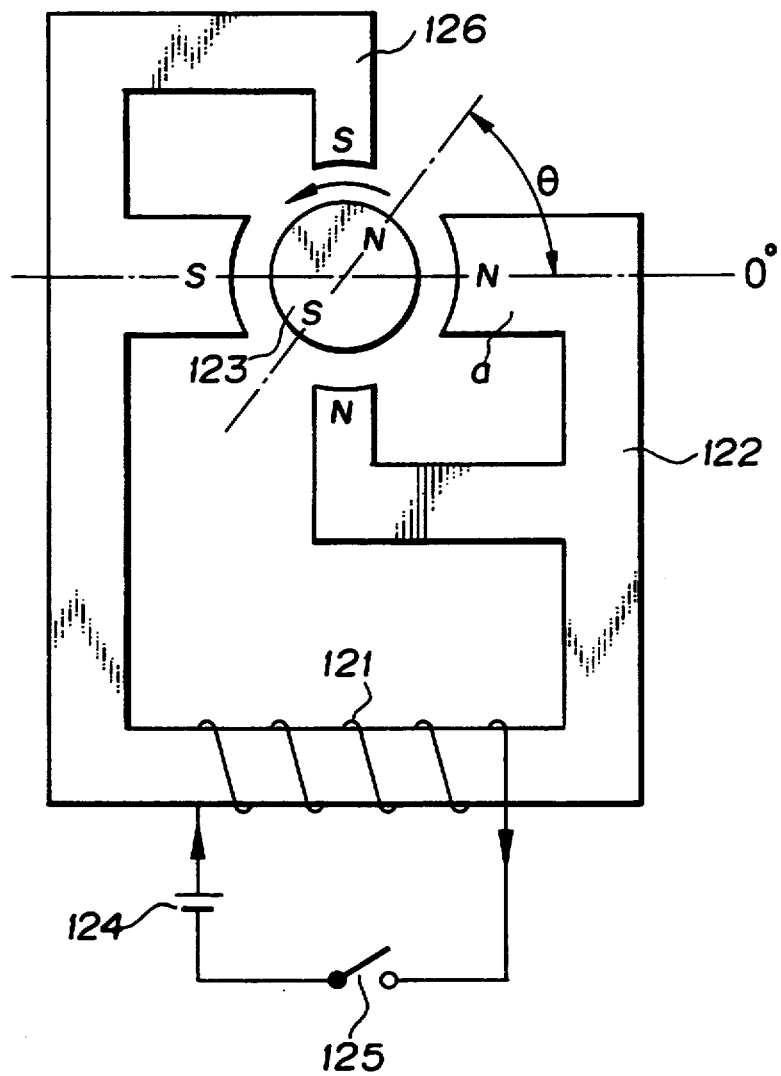
FIG. 14 schematically indicates an arrangement of a motor according to a second embodiment of the present invention, used in the light-amount controlling apparatus of the present invention.

FIG. 14 schematically shows a construction of another motor according to another embodiment of the present invention. The structure of this motor is different from that of FIG. 10 in that an auxiliary magnetic pole 126 and a major magnetic pole 122 are formed in an integral body, and this auxiliary magnetic pole 126 is branched from the major magnetic pole 122, whereas the major magnetic pole 112 is separately provided with the auxiliary magnetic pole 116 in FIG. 10. As a result, the drive torque produced by energizing the field coil is increased, resulting in a low cost by forming the major magnetic pole 122 and the auxiliary magnetic pole 126 in an integral form. Further the entire construction can be easily assembled while saving space, as compared with the the previous embodiment shown in FIG. 10.

Figure 15:
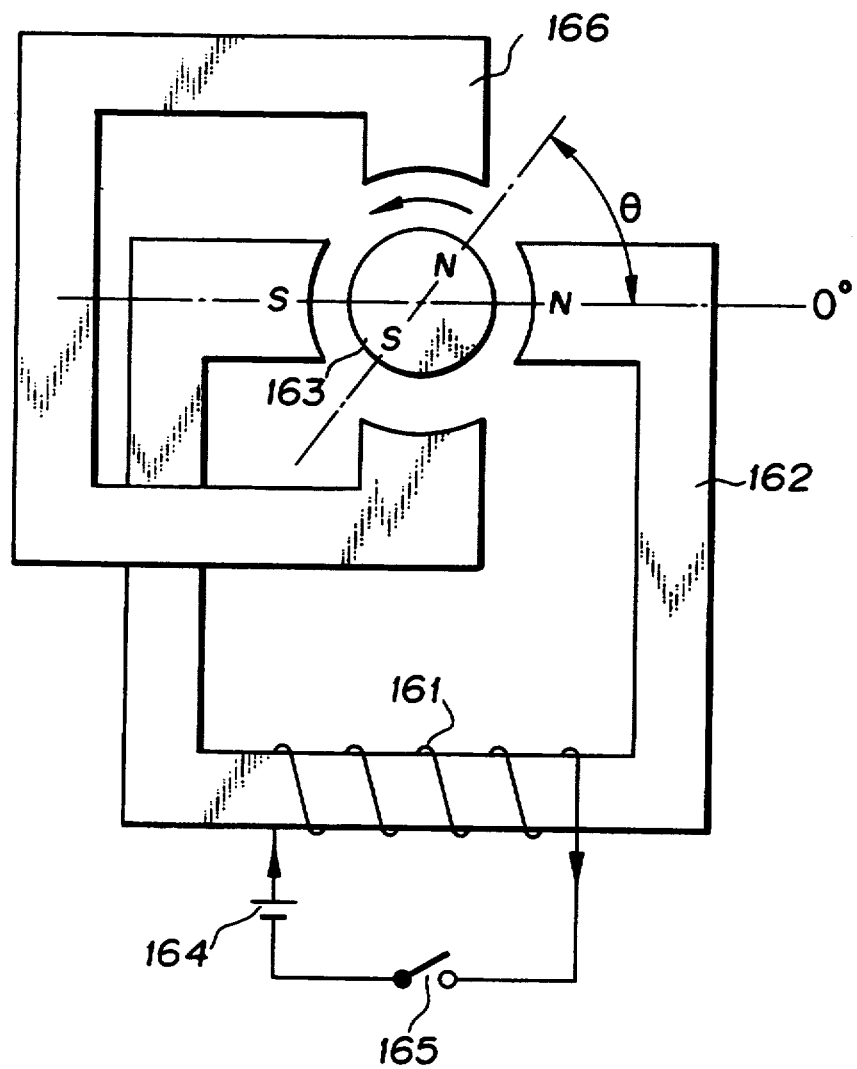
FIG. 15 schematically shows an arrangement of a motor according to a third embodiment of the present invention, utilized in the light-amount controlling apparatus of the present invention.
Figure 16:
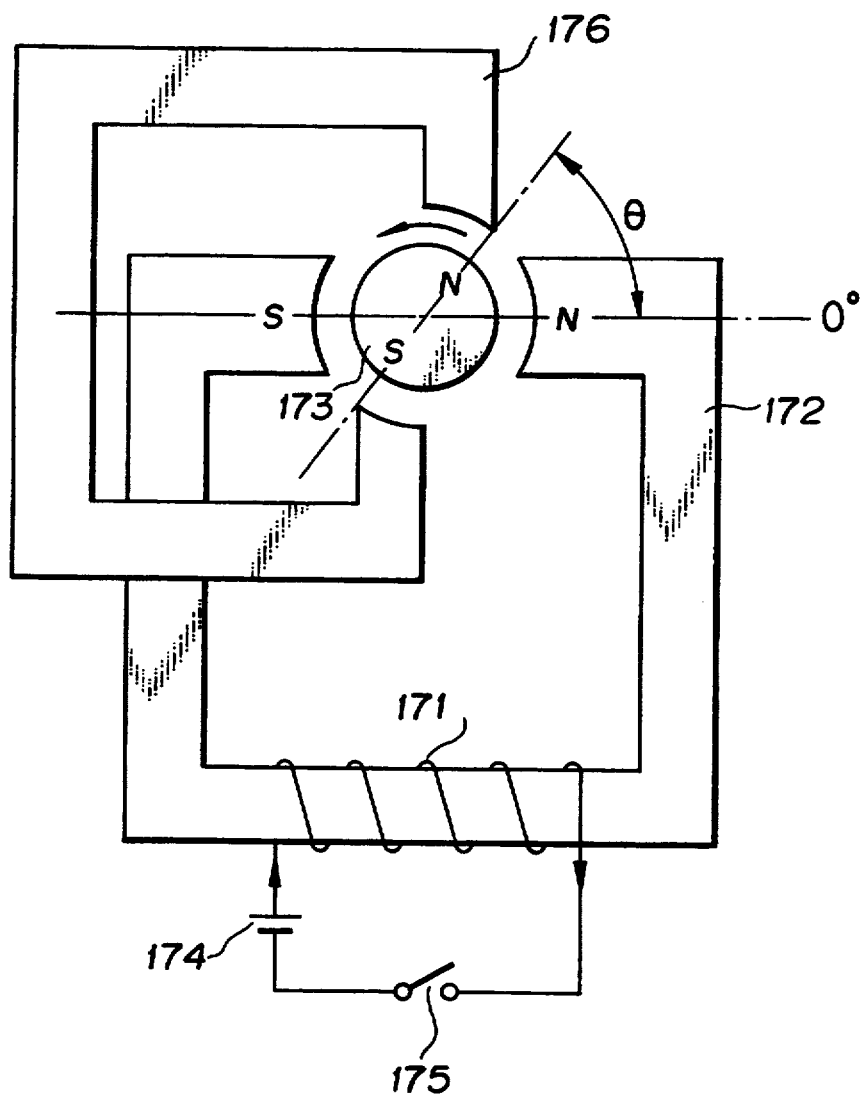
FIG. 16 schematically represents an arrangement of a motor according to a fourth embodiment of the present invention, employed in the light-amount controlling apparatus.

It should be noted that there are various detent torque controlling means other than those of FIGS. 10 and 14. For instance, as represented in FIG. 15, a gap defined between a major magnetic pole 162 and a permanent magneto rotor 163 is different than a gap defined between an auxiliary magnetic pole 166 and permanent magneto rotor 163. Stated alternatively, the second-mentioned gap about the auxiliary magnetic pole 166 is made larger than the first-mentioned gap about the major magnetic pole 162. As represented in FIG. 16, a relative angle between a major magnetic pole 172 and an auxiliary magnetic pole 176 is positionally shifted by any angle other than 90°. Alternatively, a combination with the gap difference as shown in FIG. 15 and the angle shift as indicated in FIG. 16 may be utilized.

The present invention has been described in detail with respect to the foregoing embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A light-amount controlling apparatus for controlling an amount of light passing therethrough by opening and closing a diaphragm blade, comprising:
a magneto rotor comprising a cylindrical permanent magnet, said rotor being rotatable around a shaft for opening and closing said diaphragm blade;
an electromagnetic coil;
a magnetic force inducing element for inducing a magnetic force whereby said magneto rotor is sandwiched within a space defined between two magnetic poles produced by said electromagnetic coil;
a magnetic force detecting element for detecting the magnetic force produced by said magneto rotor; and
a drive control circuit for setting said magneto rotor to a desired angular position by feeding back thereto a detection result from said magnetic force detecting element, thereby supplying a desired current to said electromagnetic coil.

2. A light-amount controlling apparatus as claimed in claim 1, wherein at least said magneto rotor, said electromagnetic coil and said magnetic force inducing element have an arc shape and are assemblable for storage along an inner wall of a lens barrel.

3. A light-amount controlling apparatus as claimed in claim 1, wherein said magnetic force detecting element is a Hall element.

4. A light-amount controlling apparatus as claimed in claim 1, wherein said magnetic force including element comprises a first stator and a second stator;
said first stator having one end from which one of the magnetic poles is induced to an adjacent portion of one side wall of said magneto rotor, and having a second end which penetrates through said electromagnetic coil and projects therefrom; and said second stator having one end from which the other magnetic pole is induced to an adjacent portion of another side wall of said magneto rotor, and having a second end which is abutted to the second end of said first stator, thereby forming a magnetic path.

5. A light-amount controlling apparatus as claimed in claim 1, wherein when said drive control circuit does not supply the current to said electromagnetic coil, said magneto rotor is energized in a first rotation direction by a rotation force produced between said magnetic force inducing element and said magneto rotor, said rotation force being in response to a magnetic force produced by said magnetic rotor; and
when said drive control circuit supplies the current to said electromagnetic coil, said magneto rotor is rotated in a second rotation direction opposite to said first rotation direction.

6. A light-amount controlling apparatus comprising:
a circular-shaped bottom plate having an opening at a center thereof, for supporting a diaphragm blade whereby said diaphragm blade can be opened and closed to control an amount of light passing through said opening;
a base plate mounted on said bottom plate, said base plate being arc-shaped so that said base plate does not project into said opening beyond a circular contour of said bottom plate;
a magneto rotor rotatably supported by said base plate and having a drive means for opening and closing said diaphragm blade;
a stator positioned and supported by said base plate, said stator having two poles located opposite to each other to sandwich said magneto rotor therewith;
an electromagnetic coil surrounding said stator; and
a cover member positioned and supported by said stator, said cover member having a bearing portion for rotatably supporting said magneto rotor, and a coupling means for coupling said base plate with said cover member.

7. A light-amount controlling apparatus as claimed in claim 6, wherein said magneto rotor includes a cylindrical permanent magnet, and said drive means comprises a drive lever made of a resin, said resin being insert molded with said cylindrical permanent magnet.

8. A light-amount controlling apparatus as claimed in claim 6, wherein said coupling means comprises an elastic hook member extending from a side edge portion of said cover member, and a stepped portion formed on said base plate being engagable with said hook member.

9. A light-amount controlling apparatus as claimed in claim 8, wherein a tip portion of said hook member is tapered.

10. A light-amount controlling apparatus as claimed in claim 6, wherein said base plate includes a stepped portion and said bottom plate includes an integrally formed hooked claw for integrally engaging said bottom plate and said base plate.

11. A light-amount controlling apparatus as claimed in claim 6, wherein said base plate and said bottom plate are integrally formed.

12. A light-amount controlling apparatus as claimed in claim 6, further comprising:
    magnetic force detecting means for detecting a magnetic force produced by said magneto rotor; and
    drive controlling means for controlling an amount of current supplied to said electromagnetic coil so as to drive said magneto rotor at a predetermined angular position based on the detection result of said magnetic force detecting means.

13. A light-amount controlling apparatus as claimed in claim 12, further comprising a flexible circuit board attached to said cover member; wherein said magnetic force detecting means includes a Hall element packaged on said flexible circuit board, and said drive controlling means includes a drive controlling circuit packaged on said flexible circuit board.

14. A light-amount controlling apparatus as claimed in claim 6, wherein said stator includes a first stator and a second stator, each stator having first and second respective ends;
    the first end of said first stator being arranged near said magneto rotor, and the second end of said first stator being arranged to penetrate through said electromagnetic coil and project therefrom; and
    the first end of said second stator being arranged adjacent to said magneto rotor, and the second end of said second stator being arranged to abut said second end of said first stator.

15. A light-amount controlling apparatus as claimed in claim 14, wherein said base plate has first and second concaves for storing said magneto rotor and an end portion of said electromagnetic coil respectively, and said cover member has first and second concaves for storing said magneto rotor and another end portion of said electromagnetic coil.

16. A light-amount controlling apparatus as claimed in claim 8, wherein said stator has a plurality of through holes for positioning and supporting said stator, said cover member has a hole, and said base plate has a shaft commonly engaged with any one of said plural through holes and with said hole of the cover member.

17. A light-amount controlling apparatus as claimed in claim 8, wherein said stator has a plurality of through holes for positioning and supporting said stator, and both said cover member and said base plate have shafts being respectively fitable into said plural through holes from both sides of said plural through holes.

18. A light-amount controlling apparatus for controlling an amount of light passing therethrough by opening and closing a diaphragm blade, comprising:
    a magneto rotor comprising a cylindrical permanent magnet, said magneto rotor being rotatable around a shaft for opening and closing said diaphragm blade;
    a magnetic force detecting element for detecting a magnetic force generated from said magneto rotor;
    an electromagnetic coil for producing a magnetic force used to rotate said magneto rotor up to a desired angular position in response to the detection result of said magnetic force detecting element;
    a base plate for assembling at least said magneto rotor and said electromagnetic coil in an arc shape so that said magneto rotor and said electromagnetic coil can be stored along an inner wall of a lens barrel; and
    a bottom plate separably formed with said base plate in an integral form, for storing said diaphragm blade in the lens barrel.

19. A light-amount controlling apparatus as claimed in claim 18, further comprising a hook claw for separably engaging both said base plate and said bottom plate in an integral form.

20. A light-amount controlling apparatus as claimed in claim 18, further comprising a screw for separably securing both said base plate and said bottom plate in an integral form.

21. A light-amount controlling apparatus as claimed in claim 18, wherein said magnetic force detecting element is a Hall element.

* * * * *